US012529175B2

(12) United States Patent
Wang

(10) Patent No.: US 12,529,175 B2
(45) Date of Patent: Jan. 20, 2026

(54) CURRENT GENERATED CLEANING DEVICE

(71) Applicant: Chi Quang Wang, Burwood (AU)

(72) Inventor: Chi Quang Wang, Burwood (AU)

( * ) Notice: Subject to any disclaimer, the term of this patent is extended or adjusted under 35 U.S.C. 154(b) by 457 days.

(21) Appl. No.: 17/773,081

(22) PCT Filed: Nov. 5, 2020

(86) PCT No.: PCT/AU2020/000128
§ 371 (c)(1),
(2) Date: Apr. 29, 2022

(87) PCT Pub. No.: WO2021/087545
PCT Pub. Date: May 14, 2021

(65) Prior Publication Data

US 2025/0179708 A1 Jun. 5, 2025

(30) Foreign Application Priority Data

Nov. 6, 2019 (AU) ................................ 2019904186

(51) Int. Cl.

| | |
|---|---|
| ***A47J 43/24*** | (2006.01) |
| ***A47L 15/00*** | (2006.01) |
| ***A47L 15/02*** | (2006.01) |
| ***A47L 15/08*** | (2006.01) |
| ***A47L 15/10*** | (2006.01) |
| ***A47L 15/42*** | (2006.01) |
| ***D06F 1/02*** | (2006.01) |
| ***D06F 17/00*** | (2006.01) |
| ***D06F 17/02*** | (2006.01) |
| ***D06F 17/04*** | (2006.01) |
| ***D06F 17/12*** | (2006.01) |
| ***D06F 34/04*** | (2020.01) |
| ***D06F 34/20*** | (2020.01) |
| ***D06F 39/12*** | (2006.01) |
| *D06F 105/02* | (2020.01) |
| *D06F 105/30* | (2020.01) |

(52) U.S. Cl.
CPC .............. *D06F 17/02* (2013.01); *A47J 43/24* (2013.01); *A47L 15/0089* (2013.01); *A47L 15/02* (2013.01); *A47L 15/08* (2013.01); *A47L 15/10* (2013.01); *A47L 15/4246* (2013.01); *D06F 1/02* (2013.01); *D06F 17/00* (2013.01); *D06F 17/04* (2013.01); *D06F 17/12* (2013.01); *D06F 34/04* (2020.02); *D06F 34/20* (2020.02); *D06F 39/12* (2013.01); *D06F 2105/02* (2020.02); *D06F 2105/30* (2020.02)

(58) Field of Classification Search
None
See application file for complete search history.

(56) References Cited

FOREIGN PATENT DOCUMENTS

CN 109518400 A * 3/2019 ............. D06F 18/00

OTHER PUBLICATIONS

Wen et al., "CN109518400A English Machine Translation.pdf", Mar. 26, 2019—Machine translation from Espacenet.com.*

* cited by examiner

*Primary Examiner* — Levon J Shahinian

(57) ABSTRACT

A current generated cleaning device in accordance with the present invention comprises: a power source, a conductor, a signal generator controller, a current output head, a current generator module, an inlet module, an outlet module, a self-erected water container, and a vertical support frame, the current generated cleaning device use current generated from the current generator module to perform the cleaning and washing of clothes or objects.

20 Claims, 3 Drawing Sheets

CURRENT GENERATED CLEANING DEVICE

TECHNICAL FIELD

This invention relates to a cleaning device, in particular it is a current generated cleaning device, to provide gentle ways of washing and cleaning clothes or objects.

BACKGROUND ART

Clothes are traditionally washed by hands by rubbing the clothes together, or beating with a wooden stick, or with feet by stepping on them, or rubbing clothes against a corrugate board, or in recent time, by a mechanical electrical washing machine, where a driving plastic or metal plate positioned at the bottom of a container, rotating either in one direction, or in alternative directions to generate movement, friction, abrasion to clothes to shake and rub stain, dirt and dirt particles off the clothes, with the assist of chemical detergent, there are some improvised methods in recent time which employs a horizontal or vertical position rotating drum to toss the clothes around to simulate the beating, rubbing, create abrasive and friction of clothes against the drum to shake and rub the stain, dirt and dirt particles off, to perform the washing.

All these traditional and improvised washing methods, however, required much energy to provide the hard, but not gentle ways, of beating, shaking, rubbing, abrading, tossing of the clothes around in the container or drum filled with water to perform the cleaning and washing of clothes, all of these movement and actions required large strong forces and energy from using the electrical motor or motors to spin to move the whole mass of clothes and water, it is therefore such washing machine requires a very strong, solid structure of the drum, container, and metal chassis, to be able to support and withstand the powerful spinning motors, and strong momentum rotational forces of the drum which contains the total mass of clothes and water, which all added up to create a very heavy and solid washing machine, it is obvious that such solid fixed, large and heavy washing machine cannot be easily moved around, folded, collapsed, disassembled, assembled and packed it into a small bag to be stored or carried away.

There are also many smaller or mini versions of the washing machines, which are made for either personal use, for baby clothes washing, or for campers, however all of the existing small and mini washing machines are designed in similar principles as that of the standard large washing machines, that is, they all have the basic components of a heavy spinning motor to generate the rotating base friction disk and/or drum, a strong fixed solid size water container, either made from metal and/or hard plastic, and the strong structure and heavy chassis to support the motor and drum so that it can support the spinning momentum of the motor and the heavy mass of clothes and water, therefore the same obvious problems still exist, that is, a small and mini washing machine still is very heavy and bulky, and can still not be able to be easily moved around, and folded, collapsed, assembled and disassembled into a small size unit to be stored or carried away.

Another problem with such traditional washing and machines are that, they can only be used to wash cloth, or clothes, but cannot be used to wash or clean brittle, hard objects such as a cup, glass, bowl or fruits for instant, which would cause all these objects to be broken, because such washing machine still using the traditional ways of employing the main components of the spinning motors, and rotating drum, the spinning and rotation will break brittle and hard objects.

It is a goal of the present invention is to create the new ways of washing and cleaning clothes or objects, by using the current generated by a current generator module to perform the soft and gentle ways of washing and cleaning of clothes or objects.

SUMMARY OF INVENTION

To overcome the said problems of the old and traditional washing machines described above, which required the solid, rigid, heavy, strong and large chassis to support the heavy motors as well as to be able to withstand the strong spinning momentum forces of both the motors and the spinning drum, the said new invention is a current generated cleaning device uses different sources and ways to perform the cleaning and washing of clothes and also objects, where the current generated by a current generator module, output at a current output head in the form of current streams of current particles to shoot, hit, knock and bombard at clothes or objects to remove stain, dirt and dirt particles stuck on them, with the use of chemical and, or detergent to assist with the washing and cleaning, since there are no tumbling, tossing, rotating or spinning actions, there is no need for the water container, the drum, and the whole device to be built in heavy, rigid and solid material with a very strong chassis to support and to withstand the powerful and strong spinning and rotation momentum forces, the said new device thus can be built, with light weight material and chassis to perform the washing and cleaning, also since there are no rotating, spinning and tumbling actions, soft objects such as fruits or hard objects such as cup, glass or ceramic can also be washed and cleaned with the said device.

The present invention related to a new current generated cleaning device which has a self-erected water container which can be self-erected standing up in vertical position, where water can be filled in, a vertical support frame can be used to provide better support to the self-erected water container for vertical erected standing up position, a signal generator controller, which is a microprogramed circuit, which controls the operation of all components, and all the functions and sequences of cleaning and washing, a power source to supply power to the whole device, a current generator module, which can be an air or water generator, which connected to a conductor, which may be a pipe or hose, the conductor is a mean to guide and conduct current to the current output head, which controls the current output intensity and flow directions, the output current, in the form current streams of particles of bubbles or droplets when air or water current generator module is used respectively, which bombard, hit, knock, rub, push and shoot at, and through clothes or objects as the ways to perform the washing and cleaning, and as the ways to remove stain, dirt and dirt particles, the current generator module, the inlet module and outlet module are controlled by the signal generator controller via the current generator module cable, the inlet module and outlet module cables respectively, the inlet module allows water to be filled in, while the outlet module allows water to be released out of the self-erected water container, the cleaning and washing is assisted with water and chemical and detergent, objects can be cloth, clothes, shoes, glass, cup, bottles, fruits, vegetable, hard, soft, or any suitable objects, the components of the said device can be assembled, disassembled, thus the whole device can be packed into a small bag for storing or carrying away.

Preferably, the said self-erected water container is made from light weight, water proof, soft, flexible material, or hard materials, metal, plastic, alloyed, or any suitable materials, as long as it can store water, it can be folded and collapsed into flat and small size.

In another preferred embodiment, the self-erected water container can be made of a small or large suitable size, and any shapes such as square, circle or oval, where applicable, but not restricted to these shapes, or sizes, so long as the it can hold water and can perform the tasks.

Preferably, the vertical support frame is made from lightweight materials, can be assembled, disassembled, and folded, and can be used with the self-erected water container to provide extra erected standing up vertical position, as well as can be used to attach and support the inlet module, outlet module, current generator module, signal generator controller and power source or any extra parts and accessories where necessary.

Preferably, the power source can be a main power supply, a battery, solar or wind power, or any power supply sources, or a combination of the above sources.

Preferably, a current generator module can be either an air or water generator, or any different type of suitable generator, where an air generator maybe an air pump or air blower, while a water generator maybe a water pump, but not limited to these types of current generators modules.

In another preferred embodiment, a single, or multiple current generators modules can be used with a single, or multiple current output heads.

In another preferred embodiment, a single or multiple current output heads can be positioned at different positions, angles and axes in the self-erected water container, to provide more evenly coverage of current flow, different flow directions and angles.

In another preferred embodiment, the current generator module can be externally positioned without attaching to the self-erected water container, such configuration may allow the current generator module to be used with any other suitable container, the generator can be connected the same ways to all the components of the said device to provide the same operation functions.

In another preferred embodiment, a single or multiple current generators modules can be used with a single or multiple current output heads, the current output heads can be positioned at the angles such that they face in the circular angles with respect to the centre of the self-erected water container, so that when the current flows, the current can generate the circular current movement, for which the objects and clothes can be driven and moved in the same circular movement as the current.

In another preferred embodiment, the inlet module, or outlet module, can be a valve, a pump, a mechanical valve or electrical valve, but not restrict to these type pumps or valves.

In another preferred embodiment, the said current generated cleaning device described above, where the self-erected water container, the vertical support frame, the signal generator controller, the current generator module, the conductor, the output current head, the inlet module, the outlet module, the double or the multiple current output heads, air and water current generators modules, the power source, the whole system, the methods of cleaning and washing, related to shapes and sizes, constructions, are not restricted and limited to above said methods, but similar and alternative to such methods and enhancement methods to the above mentioned methods can be employed, as long as the principle of such above mentioned methods and related to such principles are used.

DESCRIPTION OF EMBODIMENTS

Figure 1:
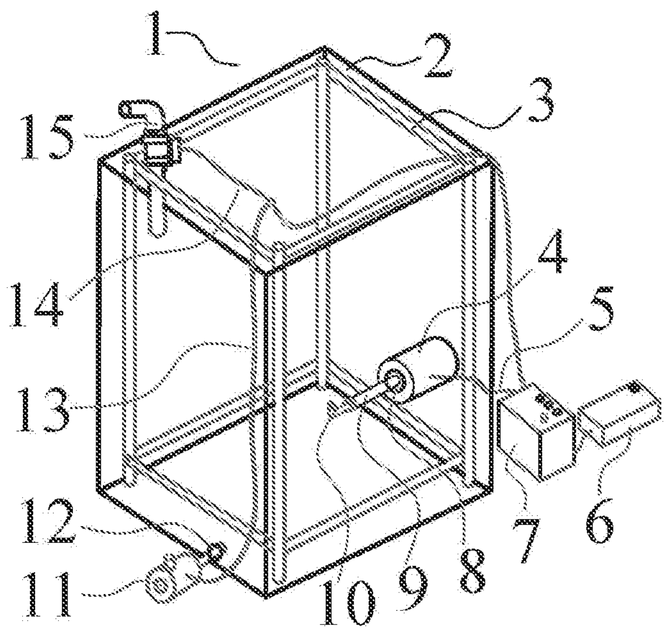
FIG. 1 is a schematic diagram showing a 3-dimensional view of a current generated cleaning device in accordance with the present invention.

We are shown in FIG. 1 a schematic diagram of a 3-dimensional view of a current generated cleaning device in accordance with the present invention wherein a current generated cleaning device (1), has a self-erected water container (2) which can be self-erected and standing up vertically, where water can be filled for cleaning and washing, a vertical support frame (3) maybe used to provide extra vertical erected standing up support to the self-erected water container (2), a current generator module hole (8) is where a conductor (9) can be inserted and assembled to the self-erected water container, the conductor (9) is connected to the current generator module (4) at one end, while the other end connected to a current output head (10), which is used to control the intensity and directions of current flow, the current is ejected, and shot out from the current output head, in the form of current streams of particles of bubbles, or droplets, depending on whether an air or water current generator module is used respectively, to knock, push, rub, and bombard at clothes or objects to perform the cleaning and washing, a signal generator controller (7) is an electronic circuit which controls whole said device (1), a power source (6) provides power to the whole device, water is filled into the self-erected water container via an inlet module (15), while water is released via an outlet module (11), the signal generator controller (7) controls the inlet module (15), the outlet module (11) and current generator module (4) via the inlet module cable (14), outlet module cable (13), and current generator module cable (5) respectively, an outlet module cable hole (12) is where the outlet module (11) can be inserted and assembled to the self-erected water container (2) objects can be cloth, clothes, shoes, cup, bottle, glass, fruit, vegetable, brittle object, the said device (1) can be assembled, disassembled, folded and parked into small bag to be stored or carried away.

Figure 2:
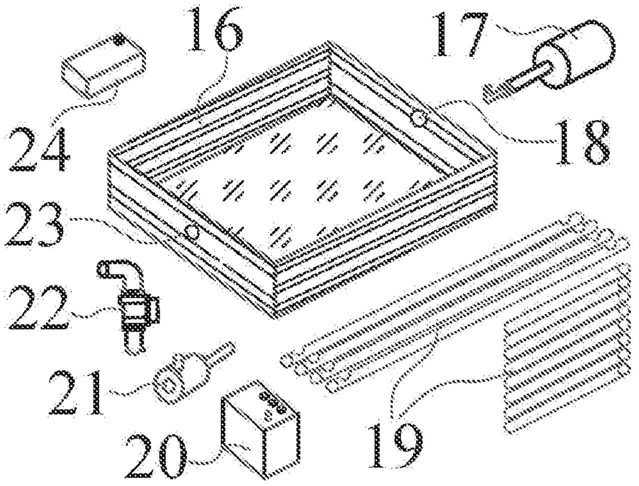
FIG. 2 is a schematic diagram showing the current generated cleaning device as described in FIG. 1, where every component of the said device is disassembled.

FIG. 2 shows the embodiment in accordance with the present invention, wherein the components of the said device shown in FIG. 1 can be disassembled, here the self-erected water container (16) is folded down, the vertical support frame (19) is disassembled as shown, all individual components are all disassembled and separated from the self-erected water container (16), here we are shown the current generator module (17) is disassembled from the current generator module hole (18), similarly, outlet module (21) is disassembled from the outlet module hole (23), the inlet module (22), the signal generator controller (20) and the power source (24) are dissembled from the self-erected water container (16) as shown.

Figure 3:
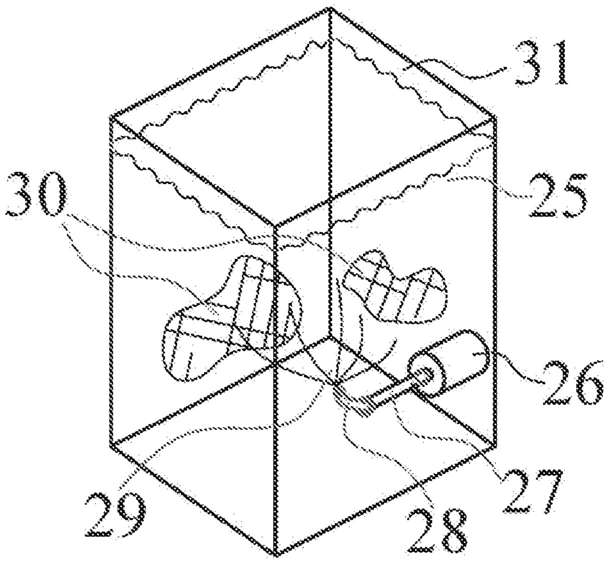
FIG. 3 is a schematic diagram showing a current generator module is used with a current output head, with clothes submerged in a self-erected water container, other components are not shown.

FIG. 3 shows an alternative embodiment in accordance with the present invention, wherein a single current generator module is use with a current output heads, the current generator module (26), which generates current to the conductor (27) which guides the current to the current output heads (28), which controls the intensity and directions of the current flow (29) to provide the current stream of particles to shoot at, rub, knock at and bombard at stain, dirt, or dirt particles on the clothes or objects (30) to perform the cleaning and washing, the self-erected water container (31) is filled with water up to level (25), other components are not shown.

Figure 4:
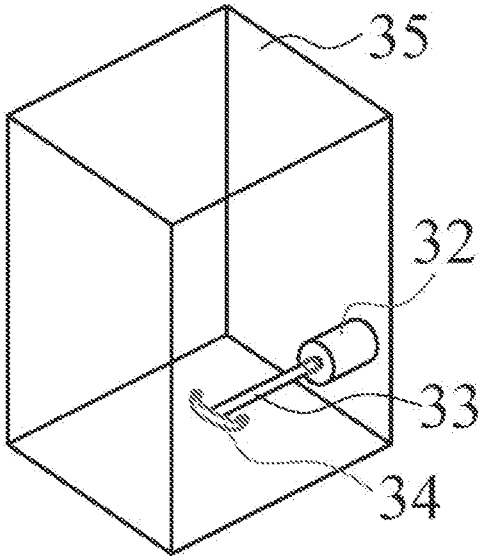
FIG. 4 is a schematic diagram showing the current generator module is used with a double current output heads, other components are not shown.

FIG. 4 is a schematic diagram of an alternative embodiment of the present invention wherein a current a self-erected water container generator module (35) is fitted with a current generator module (32), which connected to a conductor (33), which connected to a double current output heads (34), the double current output heads are used to provide more coverage of current flow, other components are not shown.

Figure 5:
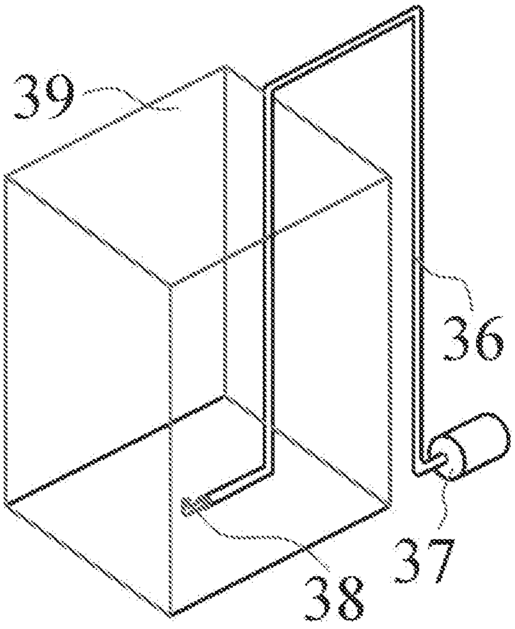
FIG. 5 is a schematic diagram showing a current generator module is detached from a self-erected water container, and connected to a conductor, and conductor connected to a current output head, other components are not shown.

FIG. 5 is a schematic diagram of an alternative embodiment of the present invention wherein a current generator module (37) is externally positioned without attaching to the self-erected water container (39), the conductor (36) is connected to the current generator module (37) at one end, while the other end connected to the current output head (38), all other components of the said device (1) can be connected to the current generator module (37) to provide the same operation functions, other components are not shown.

Figure 6:
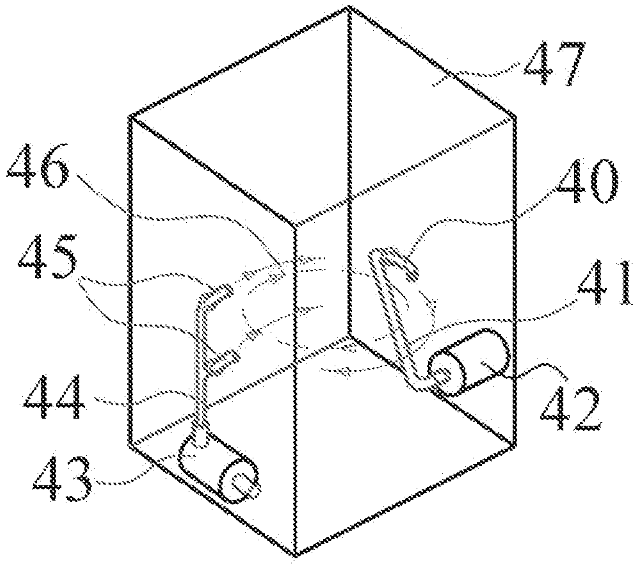
FIG. 6 is a schematic diagram showing an air current generator module is connected to a conductor, where the conducted is connected to a current output head, at the same time, a water current generator module is connected to a conductor which is connected to a double current output heads, all current output heads are facing the same clockwise direction, other components are not shown.

FIG. 6 shows an alternative embodiment in accordance with the present invention, wherein a combination of different air and water current generators modules are used with a single, and a double current output heads respectively, the multiple current generators modules are used to provide more power and intensity of output current, while the multiple current output heads are to provide more and better evenly coverage of current flow, here we are shown the self-erected water container (47) which fitted with the air current generator module (42) on the right hand side, connected to conductor (41), which connected to current output head (40), while the water current generator module (43) is fitted on the left hand side, connected to conductor (44), which connected to the double current output heads (45), all the current output heads are positioned to face in the same clockwise direction in this case, the direction of current flow (46) is observed, since all current output heads are facing the same direction, the output current flow in the same direction, which drive the clothes or objects to move in the same direction (46), other components are not shown.

The invention claimed is:

1. A current generated cleaning device comprising:

a power source;

a conductor;

a signal generator controller;

a current generator module operable connected to the signal generator controller via cables to receive signals from the signal generator controller, and to receive power from the power source;

a current output head operable coupled to the conductor, wherein current streams generated by the current generator module flow to the current output head through the conductor;

an inlet module operable connected to the signal generator controller via cables to receive signals from the signal generator controller, and to receive power from the power source;

an outlet module operable connected to the signal generator controller via cables to receive signals from the signal generator controller, and to receive power from the power source;

a self-erected water container connected to the inlet module, and the outlet module, wherein water is filled and released from the self-erected water container respectively, and wherein the self-erected water container is connected to the current generator module via the conductor; and a vertical support frame operable attached to the self-erected water container to enforce vertical standing up strength for the self-erected water container.

2. The current generated cleaning device of claim 1, wherein the current generator module is an air blower of pump; and wherein air from the air blower of pump is ejected into the water.

3. The current generated cleaning device of claim 1, wherein the current generator module is a water pump.

4. The current generated cleaning device of claim 1 further comprising: additional one or more current generator modules different from the current generator module.

5. The current generated cleaning device of claim 1 further comprising additional one or more current output heads different from the current output head.

6. The current generated cleaning device of claim 1, wherein the self-erected water container is made from a water proof material, or soft, flexible or hard materials; and wherein the self-erected water container is collapsible and foldable.

7. The current generated cleaning device of claim 1, wherein the vertical support frame is made from water proof, soft or hard materials; and wherein the vertical support frame is collapsible and foldable.

8. The current generated cleaning device of claim 1, further comprising:

additional one or more current generator modules different from the current generator module; and additional one or more current output heads different from the current output head; wherein the current generator module, the additional one or more current generator modules, the current output head, and the additional one or more current generator modules are positioned to provide evenly coverage current flow.

9. The current generated cleaning device of claim 1, wherein the inlet module, the outlet module, the current generator module, and the signal generator controller are inserted into or attached to the self-erected water container.

10. The current generated cleaning device of claim 1, wherein the inlet module, the outlet module, the current generator module and the signal generator controller are detachable from the self-erected water container.

11. The current generated cleaning device of claim 1, wherein each of the inlet module and the outlet module is a mechanical, or electrical valve or pump.

12. The current generated cleaning device of claim 1, wherein the conductor is a hard or flexible pipe or hose.

13. The current generated cleaning device of claim 1, wherein the power source is a battery, main power supply, solar panels, or wind turbines.

14. The current generated cleaning device of claim 1, wherein the signal generator controller is an electronic circuit or a microprogram circuit.

15. A cleaning device comprising:
- a self-erected water container comprising:
  - a cavity,
- a conductor comprising:
  - a first end, and
  - a second end opposite the first end,
- a current generator module connected to the first end of the conductor,
- a current output head connected to the second end of the conductor,
- an inlet module,
- an outlet module, and
- a signal generator controller,
- wherein the cleaning device is characterized by:
- a separated condition in which
  - the self-erected water container, the current generator module, the inlet module, the outlet module, and the signal generator controller are separated from one another; and
  - the self-erected water container is collapsed and folded;
- an assembled condition in which
  - the self-erected water container is extended;
  - the current output head is disposed in the cavity of the self-erected water container;
  - the inlet module is connected to the self-erected water container;
  - the outlet module is connected to the self-erected water container; and
  - the signal generator controller is connected to the self-erected water container.

16. The cleaning device of claim 15 further comprising a vertical support frame;
- wherein the cleaning device is characterized by:
  - the separated condition in which
    - the vertical support frame is collapsed;
  - the assembled condition in which
    - the vertical support frame is extended and is disposed in the cavity of the self-erected water container.

17. The cleaning device of claim 15, wherein the conductor is a first conductor;
- wherein the current generator module is a first current generator module;
- wherein the current output head is a first current output head;
- wherein the cleaning device further comprises:
  - a second conductor comprising:
    - a first end of the second conductor, and
    - a second end of the second conductor opposite the first end of the second conductor,
    - a second current generator module connected to the first end of the second conductor,
    - a second current output head connected to the second end of the second conductor,
- wherein the first current generator module is an air blower;
- wherein the second current generator module is a water pump;
- wherein the cleaning device is characterized by:
  - the assembled condition in which
    - the second current output head is disposed in the cavity of the self-erected water container.

18. The cleaning device of claim 17, wherein, during operation of the cleaning device, the self-erected water container is filled with water; and
- wherein air from the air blower is ejected into the water.

19. The cleaning device of claim 15, wherein the current output head comprises:
- a first outlet, and
- a second outlet opposite the first outlet.

20. The cleaning device of claim 15, wherein the current output head is a first current output head;
- wherein the cleaning device further comprises:
  - a second current output head connected to a middle portion of the conductor, and
- wherein the first current output head and the second current output head are extended along a same direction so as to generate a predetermined direction of a current flow of the water.

* * * * *